United States Patent [19]

Erpelding et al.

[11] Patent Number: 4,996,623
[45] Date of Patent: Feb. 26, 1991

[54] LAMINATED SUSPENSION FOR A NEGATIVE PRESSURE SLIDER IN A DATA RECORDING DISK FILE

[75] Inventors: A. David Erpelding; Darrell D. Palmer; Richard K. Wilmer, all of San Jose, Calif.

[73] Assignee: International Business Machines Corporation, Armonk, N.Y.

[21] Appl. No.: 390,558

[22] Filed: Aug. 7, 1989

[51] Int. Cl.$^5$ ................................................ G11B 5/48
[52] U.S. Cl. .................................. 360/104; 360/97.01
[58] Field of Search .............................. 360/103–106, 360/97.01, 99.01

[56] References Cited

U.S. PATENT DOCUMENTS 4,811,143  3/1989  Ohashi et al. ........................ 360/105

FOREIGN PATENT DOCUMENTS 0167162  10/1982  Japan .................................. 360/104

Primary Examiner—David J. Severin
Attorney, Agent, or Firm—Thomas R. Berthold

[57] ABSTRACT

A data recording disk file uses a laminated suspension for supporting a negative pressure slider in a manner which prevents the read/write transducer on the slider from contacting the disk surface and which eliminates the effect of stiction. The laminated suspension is a flat, flexible sheet of material bonded on both sides to patterned metal layers. The suspension comprises an arm portion for attachment to the actuator support arm, a slider portion to which the slider is attached, and a link portion interconnecting the arm and slider portions. The first metal layer is preferably stainless steel and the second metal layer is preferably copper. The arm and link portions of the stainless steel layer are spaced apart to form a hinge of flexible material. The portion of either the copper or stainless steel near the hinge region is prestressed or bent so that the link portion of the laminated suspension is biased toward the disk surface. A second similar hinge region is located between the link and slider portions of the laminated suspension and the copper or stainless steel near that hinge region is similarly bent so that only one edge of the slider contacts the disk surface when the disk is not rotating. When the disk file is turned on and the disk is at sufficient speed, the static pressure differential between opposite sides of the suspension and the slider overcome the spring forces in the two hinge regions and pull the slider into its air-bearing operational relationship with the disk surface.

13 Claims, 5 Drawing Sheets

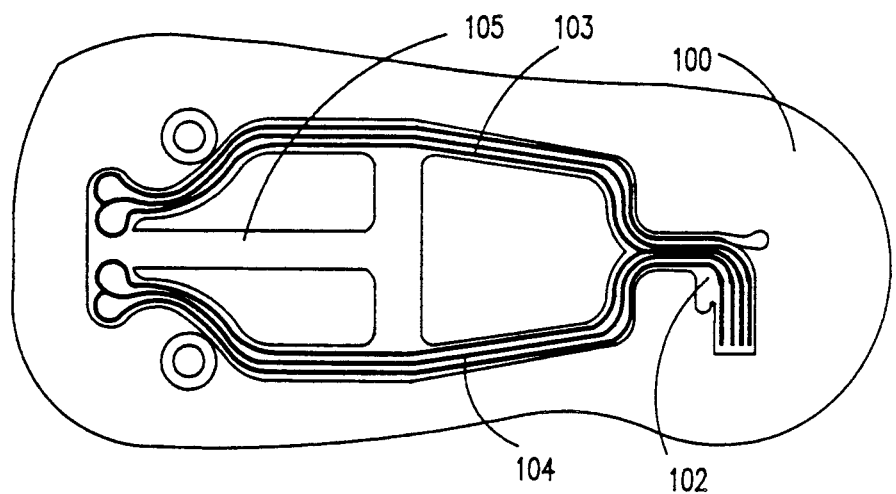
FIG. 4
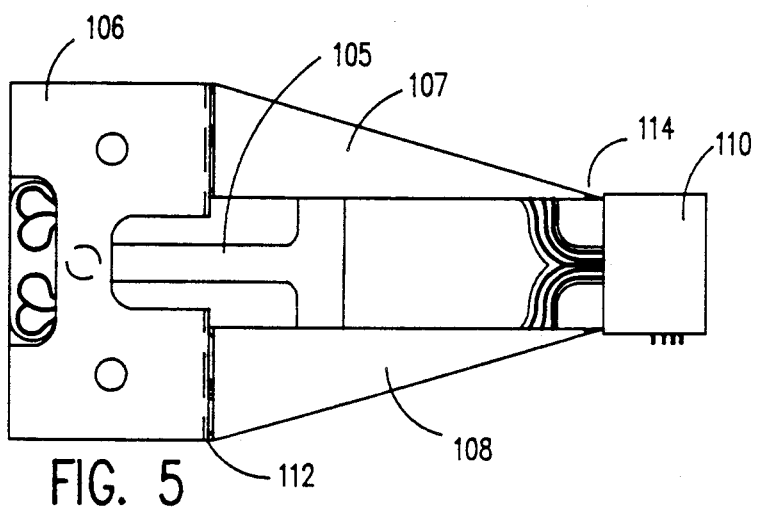
FIG. 5
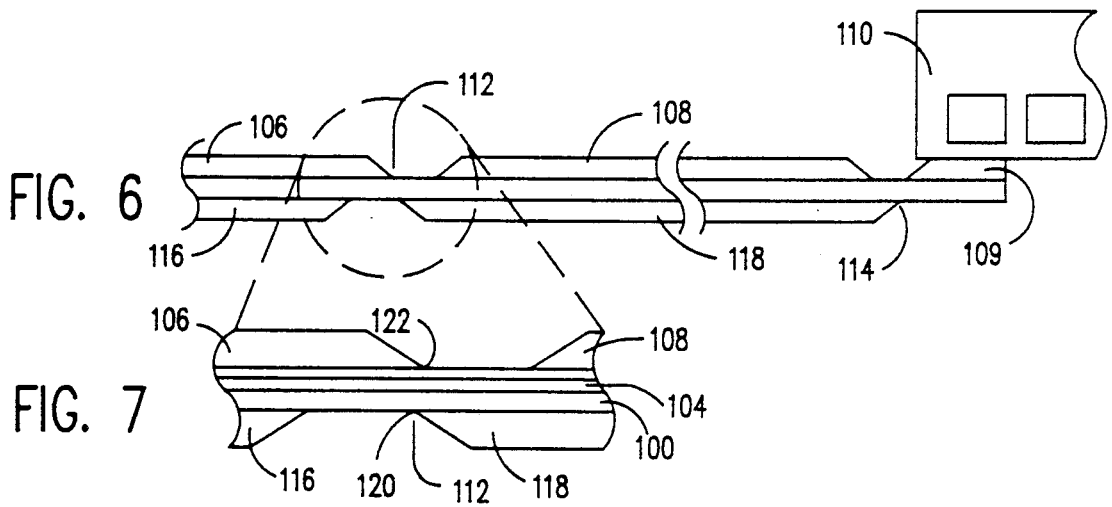
FIG. 6
FIG. 7

LAMINATED SUSPENSION FOR A NEGATIVE PRESSURE SLIDER IN A DATA RECORDING DISK FILE

TECHNICAL FIELD

This invention relates to a slider-suspension assembly for a data recording disk file, and more particularly to a laminated suspension for use with a "negative pressure" or "self-loading" slider. The invention also relates to a disk file wherein the slider-suspension assembly maintains only a portion of the negative pressure slider in contact with the disk surface when the disk is not rotating.

BACKGROUND OF THE INVENTION

Disk files are information storage devices which utilize at least one rotatable disk with concentric data tracks containing the information, a head (or "transducer") for reading data from or writing data to the various tracks, and a head positioning actuator connected to the head for moving it to the desired track and maintaining it over the track centerline during read or write operations. The transducer is attached to an air-bearing slider which is supported adjacent the data surface of the disk by a cushion of air generated by the rotating disk. The slider is connected to a support arm of the head positioning actuator by means of a suspension.

The suspension provides dimensional stability between the slider and actuator arm, controlled flexibility in pitch and roll motion of the slider relative to its direction of motion on the rotating disk, and resistance to yaw motion. In conventional disk files the suspension provides a load or force against the slider which is compensated by the force of the air-bearing between the slider's air-bearing surface and the disk surface. Thus, the slider is maintained in extremely close proximity to, but out of contact with, the data surface of the disk. The suspension typically comprises a load beam, which is mounted at one end to the actuator arm, and a flexure element which is attached to the other end of the load beam and supports the slider. The load beam provides the resilient spring action which biases the slider toward the surface of the disk, while the flexure provides flexibility for the slider as the slider rides on the cushion of air between the air-bearing surface and the rotating disk. Such a suspension is described in assignee's U.S. Pat. No. 4,167,765. An example of a conventional slider for use with such a suspension is described in assignee's U.S. Pat. No. 3,823,416.

In the conventional slider-suspension assembly, the slider is mechanically attached to the flexure element of the suspension by epoxy bonding. The electrical connection between the transducer and the disk file read/write electronics is made by twisted wires which run the length of the suspension load beam and extend over the flexure and slider. The ends of the wires are soldered or ultrasonically bonded to the transducer leads on the slider. Another type of suspension is a composite or laminated structure comprising a base layer with patterned electrical leads formed thereon and an insulating cover layer, as described in IBM Technical Disclosure Bulletin, Vol. 22, No. 4 (September 1979), pp. 1602–1603 and Japanese Kokai Nos. 53-74414 (July 1, 1978) and 53-30310 (Mar. 22, 1978). In the laminated suspension described in Japanese Kokai No. 53-74414, the slider is epoxy bonded to the laminated suspension and the transducer leads are soldered to the electrical leads formed on the suspension. Assignee's U.S. Pat. No. 4,761,699 describes a laminated suspension for use with a conventional slider wherein solder ball connections provide both the mechanical connection of the slider to the laminated suspension and the electrical connection of the transducer to the leads on the laminated suspension.

Another type of slider is a "negative pressure" or "self-loading" slider, such as disclosed in assignee's U.S. Pat. No. 3,855,625. In contrast to suspensions used with conventional sliders, in suspensions for use with negative pressure sliders it is desirable to maintain the negative pressure slider adjacent to the data surface of the disk with as low a "loading" force as possible since the slider creates a vacuum between it and the disk which holds the slider adjacent to the data surface. Assignee's U.S. Pat. No. 4,286,297 describes a suspension for use with a negative pressure slider.

One of the problems with disk files using the conventional suspension or the laminated type suspension is that after the slider has been in stationary contact with the disk surface for just a short period of time, the slider tends to resist translational movement or stick to the disk surface. This "stiction" is caused by a variety of factors, including static friction and viscous shear forces and surface tension created by the disk lubricant. Even in those disk files which have disks with extremely smooth unlubricated disk surfaces, stiction may occur because of the strong intermolecular attraction at the interface between the smooth disk and slider surfaces. One technique for solving the stiction problem is to use some type of load/unload mechanism to assure that the slider never contacts the disk surface when the disk is not rotating. Assignee's U.S. Pat. No. 4,141,049 describes a mechanism for loading and unloading a negative pressure slider to and from the disk surface. A laminated type suspension for a negative pressure slider which also expands and contracts to load and unload the slider is described in assignee's U.S. Pat. No. 4,670,804.

An additional problem with conventional slider-suspension assemblies is the damage caused to the head or disk when the slider suddenly impacts the disk, such as may occur during shipping of the disk file.

SUMMARY OF THE INVENTION

The invention is data recording disk file having a laminated suspension for supporting a negative pressure slider in a manner which prevents the read/write transducer on the slider from contacting the disk surface and which eliminates the effect of stiction. The laminated suspension is a flat, flexible sheet of material bonded on both sides to patterned metal layers. The suspension comprises an arm portion for attachment to the actuator support arm, a slider portion to which the slider is attached, and a link portion interconnecting the arm and slider portions. The first metal layer is preferably stainless steel and includes an arm portion and a link portion spaced from the arm portion. The arm and link portions of the stainless steel layer are spaced apart to define a "rear" hinge in the form of a very small length of the flexible sheet material. The second metal layer is preferably copper and includes patterned conductors for electrical connection of the transducer on the slider to the read/write electronics of the disk file. A portion of the copper (or stainless steel) in the hinge region is bent so that the link portion of the laminated suspension is biased toward the disk surface with a low loading force. A second similar hinge region is located between the link and slider portions of the laminated suspension and the copper (or stainless steel) in that hinge region is similarly bent to form a "front" hinge. The result is that only a portion of the slider (e.g. one edge) contacts the disk surface when the disk is not rotating, thereby eliminating the stiction problem. When the disk file is turned on and the disk is at sufficient speed, the static pressure differential between opposite sides of the suspension and the slider overcomes the spring force in the front hinge region and pulls the slider into its air-bearing operational relationship with the disk surface.

When two such slider-suspension assemblies are mounted on a single support arm so as to access data surfaces on adjacent disks in the disk stack, they are located sufficiently close to one another that substantial movement away from the disk surface is constrained. This constraint on movement prevents damage to the heads and disks when the disk file is exposed to sudden impact.

BRIEF DESCRIPTION OF THE DRAWINGS

FIG. 4 is plan view of a flat flexible sheet with a deposited patterned copper layer which forms a part of an alternative embodiment of the laminated suspension;

FIG. 5 is a plan view of an alternative embodiment of the laminated suspension;

FIG. 6 is an edge view of a portion of the laminated suspension depicted in FIG. 5;

FIG. 7 is an enlarged view of a hinge region of the suspension depicted in the side view of FIG. 6.

DESCRIPTION OF THE PREFERRED EMBODIMENTS

Figure 1:
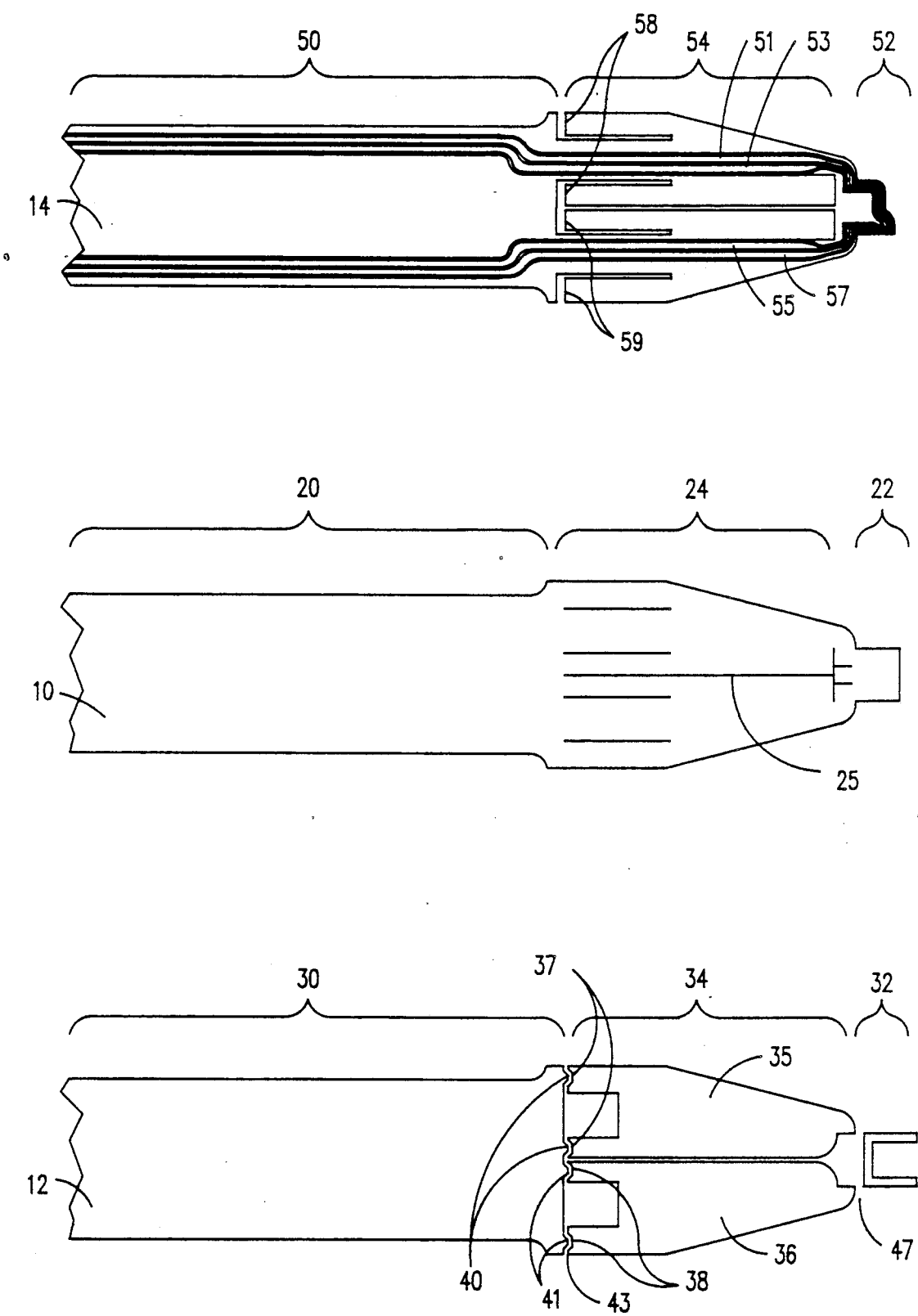
FIG. 1 is an illustration of a preferred embodiment of the present invention depicting the three layers forming the laminated suspension.

Referring first to FIG. 1, the three major components of the laminated suspension are illustrated as flat flexible sheet 10, first metal layer 12, and second metal layer 14. The sheet 10 is made of plastic material, preferably polyimide, and has an arm portion 20 for attachment to the rigid support arm, a slider portion 22 to which the negative pressure slider is attached, and a link portion 24 interconnecting the arm portion 20 and the slider portion 22. The link portion 24 is separated into two parts by a longitudinal gap 25. The gap 25 between the two parts of the link portion 24 improves the ability of the slider to move in the pitch direction during operation of the slider-suspension assembly.

The first metal layer 12 is preferably made of stainless steel and is bonded to one side of the polyimide sheet 10. The stainless steel layer 12 has an arm portion 30, a slider portion 32 and a link portion 34 which correspond to and are aligned with like portions 20, 22 and 24 of sheet 10. The link portion 34 has two links 35, 36 which are spaced apart longitudinally by the gap 25 in sheet 10. The links 35, 36 have edges 37, 38 respectively, which are spaced from corresponding edges 40, 41 of the arm portion of layer 12 when layer 12 is bonded to sheet 10. In the completed laminated suspension, because the links 35, 36 are spaced from the arm portion 30 the area of flexible material near the edges 37, 38 or 40, 41 defines a rear hinge region 43 of flexible material which permits the stainless steel links 35, 36 to bend relative to stainless steel arm portion 30 when arm portion 30 is secured to the rigid support arm. A similar front hinge region 47 of flexible material exists between slider portion 32 and the ends of links 35, 36 which permits the attached slider to bend relative to the generally rigid links 35, 36. Although the preferred configuration has link portion 34 having two links 35, 36, it is possible to achieve similar slider compliance in the pitch direction using one link and similar hinges in regions 43, 47.

The second metal layer 14 is preferably formed of copper and is bonded to the other side of sheet 10. The copper layer 14 also has an arm portion 50, a slider portion 52 and a link portion 54 which correspond to and are aligned with like portions of sheet 10. Portions of the copper layer, specifically conductors 51, 53, 55 and 57, provide electrical connection between the transducer on the slider and the read/write electronics of the disk file. In addition the portions of conductors 51, 53, 55, 57 in the hinge regions 43, 47 are bent or prestressed in the completed laminated suspension. This prestressing of the copper in these hinge regions results in a slight bending of the laminate. The laminated suspension then has a resistance to bending in these regions, which results in a slight spring force applied to the links 35, 36 and the slider portion 22 of sheet 10 and attached slider. Although the preferred configuration shows the copper in these regions being prestressed, it is possible to bend the stainless steel which in turn would displace the copper and result in a similar slight spring force. It is also possible to add shims or filler material under the slider to produce a similar displacement in the copper when the slider is positioned on the disk surface and thus produce the same spring force. It is this feature of the laminated suspension which allows the negative pressure slider to be loaded and unloaded to the disk in the manner which will be more fully explained with reference to FIG. 3A, FIG. 3B and FIGS. 9A thru 9D.

While the laminated suspension has been depicted in FIG. 1 and explained as three separate components for ease of explanation, the laminate is fabricated as solid layers of stainless steel and copper bonded to a solid sheet of polyimide. This structure is then etched on both sides to form the stainless steel and copper patterns shown in FIG. 1. The solid stainless steel and copper layers can be bonded to sheet polyimide by means of conventional adhesive, such as model WA available from Dupont, or a liquid polyimide-based adhesive. Alternatively, a liquid polyimide can be applied to one of the solid metal layers, the second solid metal layer then placed on top of the liquid polyimide, and the two layers then pressed together while the polyimide is cured and adhered to the metal layers. The etching of the metal layers and the forming of the gaps in the polyimide is done with conventional techniques, such as those used in forming flexible conductive cable. Following the fabrication of the laminated suspension in this manner, the suspension is placed in a fixture and a slight bend is applied to the hinge regions 43, 47. This displaces the copper conductor portions which span the hinge regions and creates the necessary spring forces in these regions.

Figure 2:
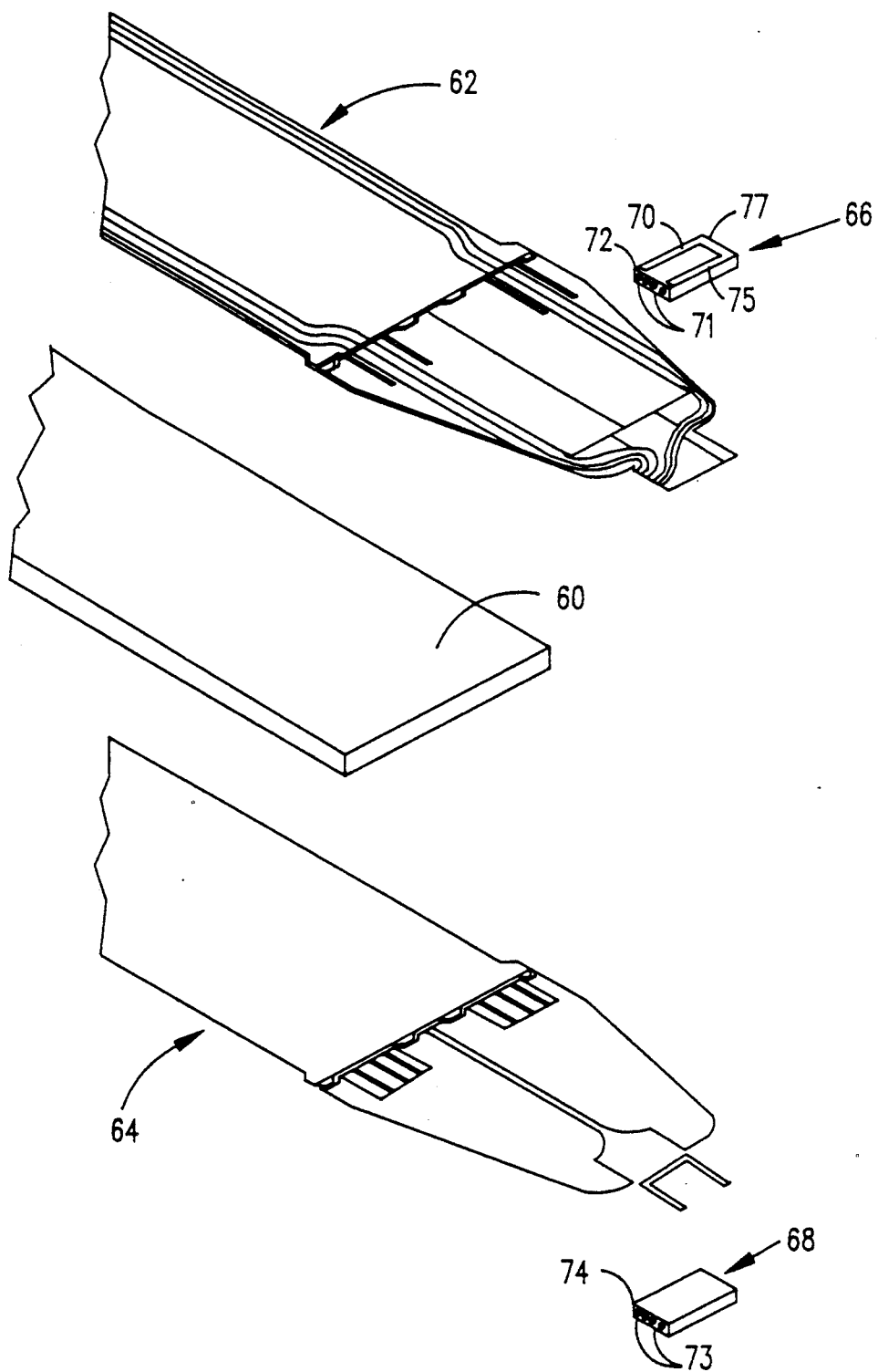
FIG. 2 is a perspective exploded view of two laminated suspensions, two sliders and a single support arm.

Referring now to FIG. 2, there is illustrated an exploded view of a support arm 60, two laminated suspensions 62, 64 for attachment to support arm 60, and two negative-pressure sliders 66, 68 for attachment to respective suspensions 62, 64. The arm 60 may be conventional stainless steel or a ceramic material. The arm portions of the first metal layer, i.e the stainless steel layer (item 12 in FIG. 1), of suspensions 62, 64 are secured to opposite faces of the support arm 60 by conventional techniques, e.g. machine screws (not shown), laser welding, or epoxy bonding if the arm is a ceramic material. When the completed slider-suspension-arm assembly of FIG. 2 is assembled into a disk file, slider 66, having a leading edge 77, an air-bearing surface 70, with read/write transducers 71 on its trailing edge 72, will access a data recording surface of one disk and slider 68, with read/write transducers 73 on its trailing edge 74, will access the data recording surface of an adjacent disk in the disk stack.

Figure 3A:
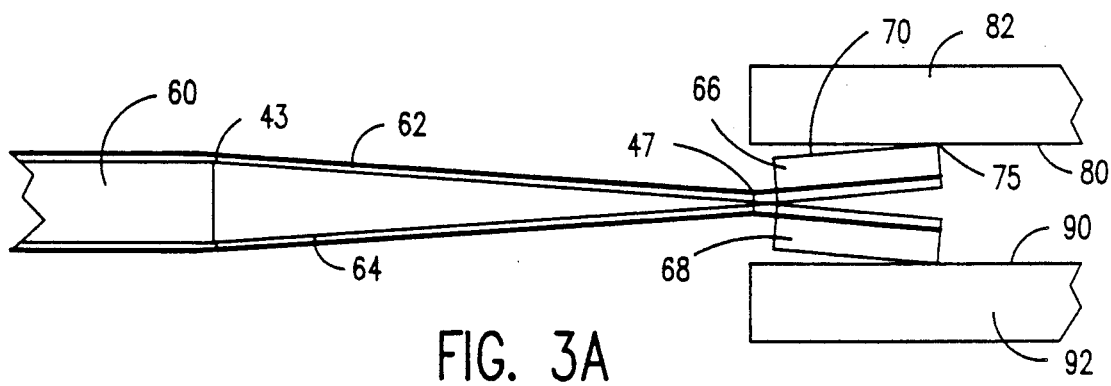
FIG. 3A is a side view of a support arm with attached back-to-back laminated suspensions and sliders, and a pair of disks in section, illustrating the position of the slider-suspension assemblies when the disk file is not operating, with the hinges being formed such that the outer edges of the sliders are in contact with the disk.
Figure 3B:
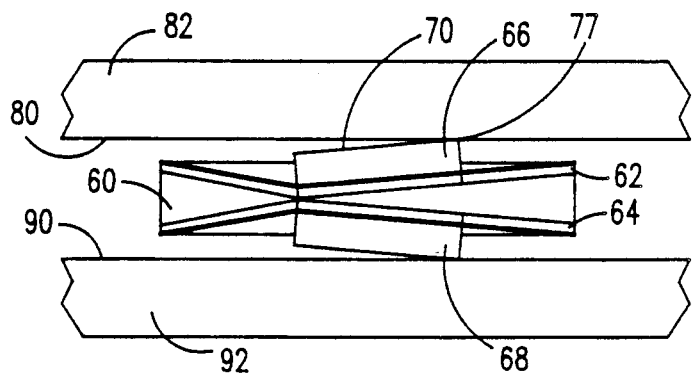
FIG. 3B is an end view of a support arm with attached back-to-back laminated suspensions and sliders and a pair of disks in section, illustrating the position of the slider-suspension assemblies when the disk file is not operating, with the hinges being formed such that the leading edges of the sliders are in contact with the disks.

The laminated suspensions 62 and 64, and their attached sliders 66, 68 are shown in FIG. 3A and FIG. 3B mounted to support arm 60 and in operative relationship to data surfaces 80, 90 of disks 82, 92 respectively. The operation of the slider-suspension assemblies will be explained with reference to suspension 62; it being understood that adjacent suspension 64 operates in a like manner. The position of slider 66 wherein only outer edge 75 or leading edge 77 is in contact with disk surface 80 is the position assumed when the disks 82, 92 are not rotating. The spring force supplied by the conductors 51, 53, 55, 57 (FIG. 1) of the second metal layer in the hinge region 43 biases the link and slider portions of suspension 62 toward disk surface 80. This provides the necessary loading force for the negative pressure slider 66. Similarly the spring force supplied by the conductors 51, 53, 55, 57 in the hinge region 47 between the slider and link portions causes the slider to be bent toward the disk surface 80 out of the plane of the suspension link portion. In this manner the air-bearing surface 70 of the slider is not in contact with disk surface 82 when the disk file is not operating. Thus there is no stiction between the slider 66 and disk surface 80 at start-up of the disk file. When the disk file begins operation and disks 82, 92 begin rotating the static pressure differential between the opposite sides of suspension 62 and between the air-bearing surface 70 and the back side of the slider portion of the suspension causes the slider 66 and suspension 62 to move toward the disk surface 80. When the disk is rotating at sufficient speed to generate the negative pressure air-bearing effect on the air-bearing surface 70, the spring force in front hinge region 47 is overcome and the slider is then maintained in its air-bearing operational relationship with disk surface 80. When the disk file is turned off and disk rotation slows to remove the air-bearing effect, the spring force in the front hinge region 47 provides a restoring force which unloads the slider 66 away from the disk surface 80 while maintaining the edge 75 in contact with the disk surface 80.

While the embodiment depicted in FIGS. 1-3 is described in a manner such that slider 66 has an initial roll or pitch angle wherein only outer edge 75 (FIG. 3A) or leading edge 77 (FIG. 3B) contacts disk surface 80, it is possible to prestress conductors 51, 53, 55, 57 (FIG. 1) in hinge region 47 in a manner such that slider 66 has both initial pitch and roll angles. In this case, only a portion of air-bearing surface 70, e.g. the corner area between edges 70 and 77 (FIG. 2), contacts disk surface 80 when the disk file is not operating.

Figure 8:
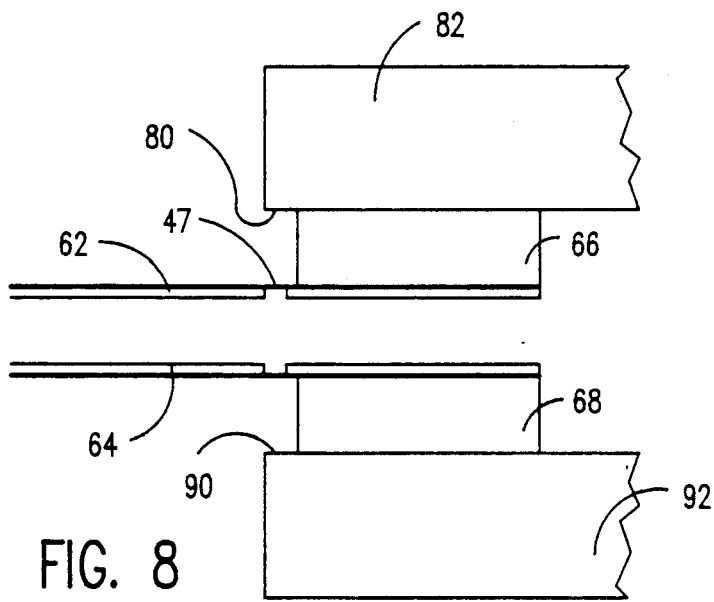
FIG. 8 is an enlarged view illustrating back-to-back slider-suspension assemblies in their loaded or operational position on the disks.

The operation of suspension 64 and slider 68 is identical to that just described. Thus, when both sliders 66, 64 are loaded to their disk surfaces they assume the position depicted in FIG. 8. It should be apparent, by reference to FIGS. 3 and 8, that the present invention permits the sliders to be closely spaced between the disks. This close spacing constrains the movement of the sliders so that in the event the disk file is subjected to sudden impact the sliders can not achieve a velocity sufficient to cause damage to the heads or disks.

An alternative embodiment of the present invention is depicted in FIGS. 4-7. Referring to FIG. 4, there is illustrated a flat, flexible sheet 100 of polyimide having a patterned layer 102 of copper, corresponding to the second metal layer 14 of the embodiment of FIG. 1. The copper layer 102 includes electrical conductor portions 103, 104 and a non-conductor spring portion 105 which provides the spring bias as previously described.

The alternative embodiment of the completed slider-suspension assembly is illustrated in FIG. 5. The primary difference between the embodiment of FIGS. 4-7 and that of FIG. 1 is the additional layer of stainless steel, which comprises an arm portion 106, links 107, 108, and a slider portion 109 (FIG. 6), all of which are bonded to sheet 100. The spring portion 105 of the copper layer 102 is prestressed to provide a slight spring force to the link portions 107, 108 in the hinge region 112 so that slider 110 is biased toward its associated disk surface. A similar spring force is applied by the portions of conductors 103,104 in the hinge region 114.

The suspension of FIG. 5 is shown in side view in FIG. 6, wherein the first metal layer of stainless steel is depicted. The first metal layer also includes an arm portion 116 and a link 118, which correspond, respectively, to arm portion 106 and link 108 of the additional stainless steel layer. (A similar link, not shown, is also part of the first metal layer and is located in corresponding relationship to link 107).

An enlarged view of the hinge region 112 is illustrated in FIG. 7. The link 118 has an edge 120 which is in direct alignment with an edge 122 of arm portion 106. The result of this alignment is that the hinge has essentially no length. Because there is no polyimide material in the lengthwise direction of the suspension in the hinge region 112, the suspension has improved stiffness in this direction. This characteristic is important in order to assure accurate track following by the transducer attached to the slider 110. A similar zero-length hinge exists in the hinge region 114 (FIG. 6) due to the alignment of the corresponding edges of link 118 and slider portion 109. The zero-length hinges are formed as part of the previously described fabrication process, wherein the stainless steel and copper layers are etched through a mask. The zero-length hinge described here and in FIG. 7 is also present in the embodiment of FIG. 1. In particular, with respect to hinge region 43, the edges 40, 41 of the stainless steel layer 12 are in direct alignment with the edges 58, 59, respectively, of the copper layer 14.

Figure 9A:
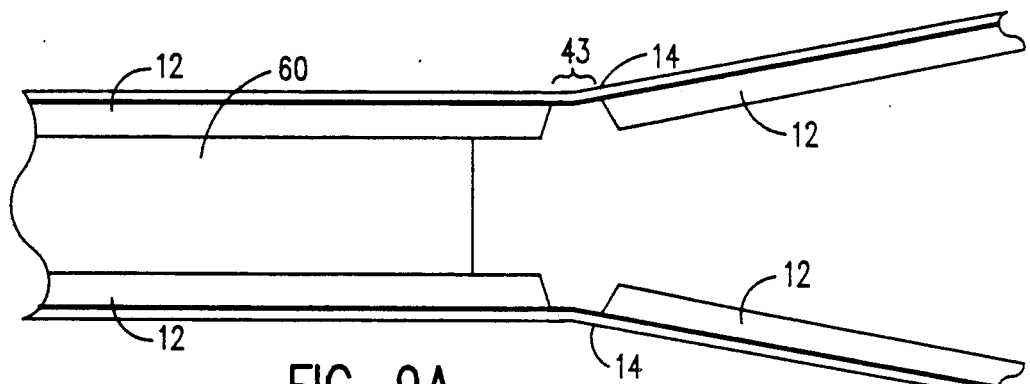
FIGS. 9A and 9B illustrate one embodiment for stressing the copper in the hinge regions of the suspension by bending the copper layer.
Figure 9B:
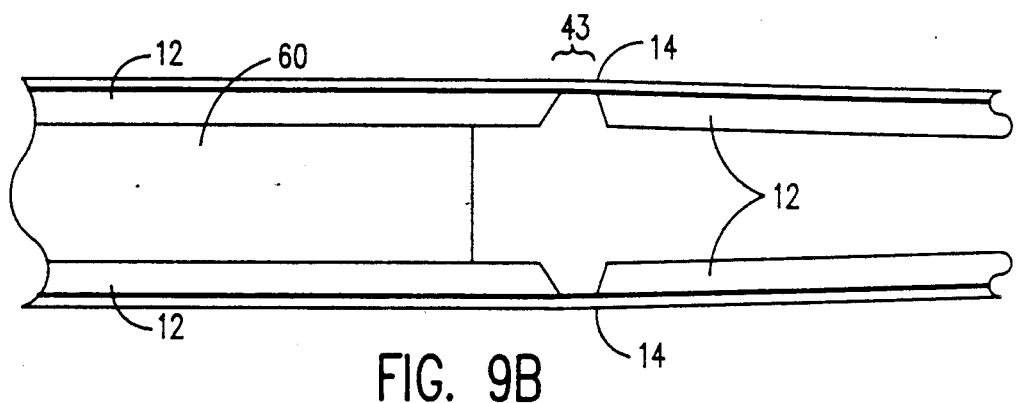
Figure 9C:
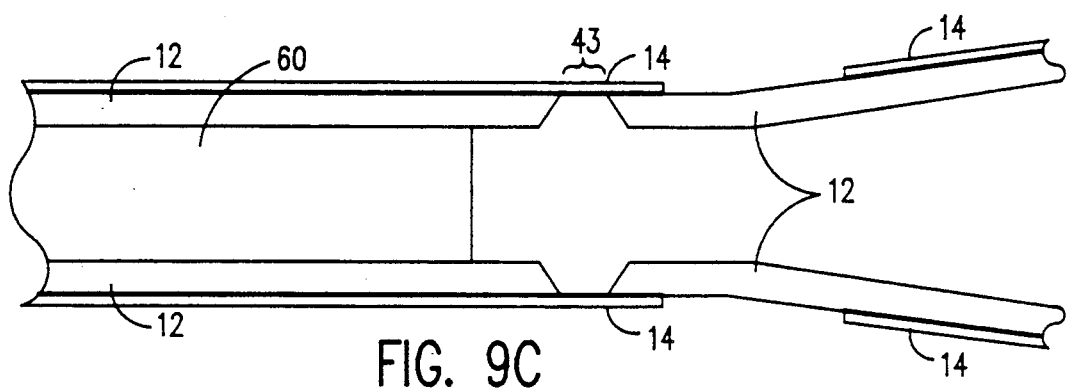
FIGS. 9C and 9D illustrate an alternative embodiment for stressing the copper in the hinge regions of the suspension by bending the stainless steel layer.
Figure 9D:
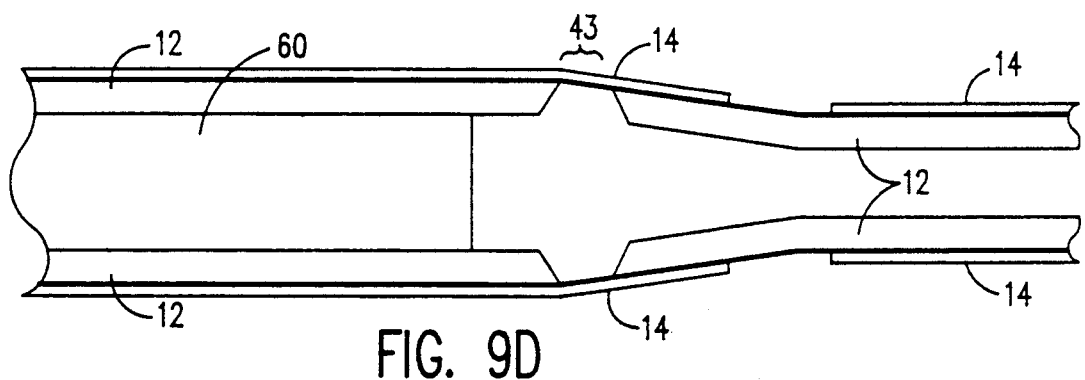

There are two embodiments which produce a loading force in the suspension. FIGS. 9A thru 9D illustrate these embodiments by use of an enlarged view of the rear hinge areas 43. The same techniques are applicable to the front hinge area 47. Referring to FIG. 9A, copper layer 14 can be formed to produce a displacement of the suspension such that when the sliders are loaded between the disks (FIG. 9B) copper layer 14 is stressed and produces a loading force onto the disk. Alternatively, as shown in FIG. 9C, the stainless steel layer 12 can be bent to produce a similar displacement of the suspension. When the sliders are then loaded between the disks (FIG. 9D) the suspensions are displaced, with the result being that the copper layer 14 is stressed and produces a loading force onto the disk.

While the arm assembly depicted in FIG. 2 is designed for use with a linear actuator, i.e. one in which the actuator and attached arm assembly move in a precise radial direction perpendicular to the data tracks on the disks, the present invention is applicable for use with a rotary actuator in which the slider is moved in an accurate path which is only generally in the radial direction. For example, if the suspension were to be used with a rotary actuator which uses an in-line suspension, i.e. one in which the length of the suspension lies on a line which intersects the axis of rotation of the actuator and which is generally colinear with the support arm, the arm assembly would appear as in FIG. 2 with the exception that the sliders would be rotated 90 degrees so that the edges 72, 74 which contain the read/write transducers 71, 73, respectively, would be at the outer end of the arm assembly. The conductive portion of the copper layer in the hinge region 47 (FIG. 3A) would then be bent in the opposite direction to that shown in FIG. 3A so that the edge of the slider closest to the actuator contacted the surface 80 of disk 82.

While the preferred embodiments of the present invention have been illustrated in detail, it should be apparent that modifications and adaptations to those embodiments may occur to those skilled in the art without departing from the spirit and scope of the present invention as set forth in the following claims.

What is claimed is:

1. A suspension for use in a data recording disk file of the type having a disk with a data surface of concentric data tracks, means for rotating the disk about an axis generally perpendicular to the disk, a transducer for writing data to or reading data from the data tracks, the transducer being attached to a negative pressure air-bearing slider maintained adjacent the data surface, means for actuating the slider generally radially relative to the disk so as to permit the transducer to access the data tracks, a support arm attached to the slider actuating means, and a suspension connecting the support arm to the slider, the suspension being a laminate structure comprising:

a flat, flexible sheet of nonconductive material, the sheet having an arm portion for attachment to the support arm, a slider portion for attachment to the slider, and a link portion connecting the arm portion and the slider portion;

a first metal layer secured to one side of the sheet, the first metal layer having an arm portion for attachment to the support arm and a link portion spaced from the arm portion so as to define a first hinge region of the flexible sheet; and a second metal layer secured to the other side of the sheet, the second metal layer including electrical conductor portions extending from the arm portion of the sheet to the slider portion of the sheet for electrical connection to the transducer and a first hinge portion adjacent to and extending across the first hinge region of the sheet for providing a spring force to the slider, wherein a disk loading force is applied to the slider when the slider is attached to the slider portion of the sheet, the arm portions of the sheet and first metal layer are attached to the support arm, and the slider is positioned on a disk surface.

2. The suspension according to claim 1 wherein the first hinge portion of the second metal layer is part of the electrical conductor portions of the second metal layer.

3. The suspension according to claim 1 wherein the first hinge portion of the second metal layer is bent so as to provide a loading force when the slider is positioned on a disk surface.

4. The suspension according to claim 1 wherein the first hinge portion of the second metal layer is not bent and a portion of the first metal layer near the hinge region of the sheet is bent so as to allow the first hinge portion of the second metal layer to provide a loading force when the slider is positioned on a disk surface.

5. The suspension according to claim 1 wherein the conductor portions of the second metal layer include a second hinge portion between the link portion of the sheet and the slider portion of the sheet for causing the slider portion of the sheet to flex relative to the link portion of the sheet.

6. The suspension according to claim 1 wherein the second metal layer includes a non-conductor portion overlying a substantial extent of the first hinge region of the flexible sheet and having an edge generally parallel to an edge of either the arm or link spaced-apart portions of the first metal layer, wherein the length of the hinge region of the sheet is minimized.

7. The suspension according to claim 1 further comprising a third metal layer overlying the second metal layer, the third metal layer having arm and link portions aligned with corresponding arm and link portions of the first metal layer.

8. The suspension according to claim 7 wherein an edge of either the arm or link portions of the first metal layer in the first hinge region is directly aligned with an edge of either the link or arm portion, respectively, of the overlying third metal layer, wherein the portion of the flat sheet in the first hinge region has essentially no length.

9. A transducer-slider-suspension-arm assembly for use in a data recording disk file of the type having a rotatable disk with a data surface of concentric data tracks and an actuator for moving the transducer generally radially relative to the disk so as to read data from or write data to the data tracks during rotation of the disk, the transducer-slider-suspension-arm assembly comprising:

a generally rigid support arm having one end for attachment to the actuator;

a laminate suspension further comprising (a) a flat, flexible sheet of nonconductive material, the sheet having an arm portion attached to the support arm, a slider portion, and a link portion connecting the arm portion and the slider portion; (b) a first metal layer secured to one side of the sheet, the first metal layer having an arm portion attached to the support arm and a link portion spaced from the arm portion so as to define a first hinge region of the flexible sheet; and (c) a second metal layer secured to the other side of the sheet, the second metal layer including electrical conductor portions extending from the arm portion of the sheet to the slider portion of the sheet, a first hinge portion extending across the first hinge region of the sheet for providing a spring force to the link portion of the sheet, and a second hinge portion extending across the region between the slider and link portions of the flexible sheet for providing a spring force the slider portion of the sheet; and a negative pressure air-bearing slider secured to the slider portion of the sheet and having an attached transducer electrically connected to the conductor portions of the second metal layer, wherein a disk loading force is applied to the slider by the first hinge portion of the second metal layer and a disk unloading force is applied to the slider by the second hinge portion of the second metal layer.

10. The assembly according to claim 9 wherein the first and second hinge portions of the second layer are bent.

11. The assembly according to claim 9 wherein portions of the first metal layer near the first hinge region of the sheet and near the region between the slider and link portions of the sheet are bent.

12. A data recording disk file comprising:
a disk with a data surface of concentric data tracks;
means attached to the disk for rotating the disk about an axis generally perpendicular to the disk;

a negative pressure slider having an air-bearing surface for maintaining the slider in operative relationship with the data surface when the disk is rotating;

a transducer attached to the slider for writing data to or reading data from the data tracks;

an actuator for moving the slider generally radially relative to the disk so as to permit the transducer to access the data tracks;

a support arm attached to the actuator; and a laminated suspension further comprising a flat flexible sheet of nonconductive material and patterned first and second metal layers bonded to opposite sides of the flexible sheet, the laminated suspension having an arm portion attached to the support arm, a slider portion attached to the slider, and a link portion having one end connected to the arm portion at a first hinge region of the flexible sheet and its other end connected to the slider portion at a second hinge region of the flexible sheet, and wherein the patterned metal of one of said metal layers is electrically conductive and provides electrical connection from the support arm to the slider, the patterned metal of one of said metal layers near the first hinge region is bent so that the link portion and the slider are biased toward the disk surface and the patterned metal of one of said metal layers near the second hinge region is bent so that only a portion of the slider is biased into contact with the disk surface when the disk is not rotating.

13. The disk file according to claim 12 further comprising a second like disk, a second like suspension and a second like slider, the second suspension with attached second slider being mounted to the support arm so as to be in back-to-back relationship with said first suspension and attached first slider.

* * * * *